United States Patent [19]
Wurz et al.

[11] Patent Number: 4,802,901
[45] Date of Patent: Feb. 7, 1989

[54] LIQUID SEPARATOR

[75] Inventors: Dieter Wurz, Riefstahstr. 6, D-7500 Karlsruhe 1; Max Zimmermann, Karlsruhe, both of Fed. Rep. of Germany

[73] Assignee: Dieter Wurz, Fed. Rep. of Germany

[21] Appl. No.: 84,918

[22] Filed: Aug. 13, 1987

[30] Foreign Application Priority Data

Aug. 14, 1986 [DE] Fed. Rep. of Germany ....... 3627555

[51] Int. Cl.$^4$ ............................................. B01D 45/08
[52] U.S. Cl. ........................................ 55/440; 55/443; 55/464; 261/DIG. 11
[58] Field of Search ........... 55/257 PV, 440, 442–446, 55/464; 261/DIG. 11

[56] References Cited

U.S. PATENT DOCUMENTS

| 1,956,591 | 5/1934 | Gies | 55/440 X |
| 3,254,475 | 6/1966 | Farr et al. | 55/440 X |
| 3,405,511 | 10/1968 | Halter et al. | 55/440 |
| 3,849,095 | 11/1974 | Regehr | 55/440 X |
| 3,938,972 | 2/1976 | Sugimura | 55/440 |
| 3,950,156 | 4/1976 | Kall | 55/440 |
| 4,141,706 | 2/1979 | Regehr | 55/440 X |
| 4,175,938 | 11/1979 | Regehr et al. | 55/442 X |
| 4,198,215 | 4/1980 | Regehr | 55/440 X |
| 4,268,284 | 5/1981 | Kent et al. | 55/440 X |
| 4,543,108 | 9/1985 | Wurz | 55/440 X |

FOREIGN PATENT DOCUMENTS

| 257368 | 3/1913 | Fed. Rep. of Germany . |
| 1544144 | 7/1969 | Fed. Rep. of Germany . |
| 2336447 | 3/1975 | Fed. Rep. of Germany . |
| 2439614 | 3/1976 | Fed. Rep. of Germany . |
| 2510754 | 10/1976 | Fed. Rep. of Germany ........ 55/440 |
| 2553198 | 6/1977 | Fed. Rep. of Germany ........ 55/440 |
| 2628628 | 12/1977 | Fed. Rep. of Germany ........ 55/440 |
| 3103524 | 8/1982 | Fed. Rep. of Germany ........ 55/440 |
| 1465044 | 2/1977 | United Kingdom . |
| 2128100 | 4/1984 | United Kingdom ................. 55/440 |

Primary Examiner—Robert H. Spitzer
Attorney, Agent, or Firm—Pasquale A. Razzano

[57] ABSTRACT

In a liquid separator for separating liquid components entrained in a two-phase flow, in which the flow is passed through a channel provided with trap pockets for trapping the liquid components and the trap pockets have guide plates upstream thereof the ends of which have separating edges for introducing the liquid into the trap pockets, provision is made for increasing the separating capacity and for reducing the pressure losses by having each separating edge of the respective guide plate disposed at a distance (b) upstream of the associated trap pocket and by making the end of the guide plate curve in the direction leading into the trap pocket.

16 Claims, 2 Drawing Sheets

LIQUID SEPARATOR

The invention is directed to a liquid separator for separating liquid components entrained in a two-phase flow (gas/liquid), in which the flow is passed through a channel provided with trap pockets for the liquid components and the trap pockets have guide plates upstream thereof which at their ends have separating edges for the liquid, in which the separating edge of each guide plate is disposed at a distance upstraam of the leading edge of the associated trap pocket.

In a known liquid separator of the specified kind (GB-PS No. 1,465,044) the "film traps" formed of the guide plates and trap pockets are disposed on the convex portions of the channel walls at the deflections and are therefore disposed in such a way that the entrained droplets are subjected to centrifugal acceleration whereby a portion of the droplets is deflected to the opposite channel walls instead of into the trap pocket.

In a further known liquid separator (DE-PS No. 2,336,447) the channel is configured of adjacent parallel structural members having a plurality of successive deflections and trap pockets. On the convex side of each deflection a trap pocket is provided. Guide plates arch into the first two deflections, as viewed in the direction of flow, and extend right into the trap pockets. In other words, the trap pockets overlap the free ends of the guide plates. In this arrangement, the guide plate extends too closely to the leading edge of the free end of the trap pocket. The film arriving on the guide plate must overcome the stagnation zone with recirculating flow upstream of the trap pocket in order to reach the interior of the trap pocket. During this process the film will lose a large part of its kinetic energy and will thicken for reasons of continuity. The arrangement at the first deflections therefore tends to choke the inlet openings. If a liquid bridge has once been formed in the inlet opening, succeeding liquid components will be dragged along across the choked inlet opening.

The farther downstream trap pockets have guide plates disposed upstream thereof whose separating edge is provided in front of the associated trap pocket. But since the separating edge is not directed towards the interior of the trap pocket, a considerable portion of the separating film is passed around the trap pocket.

Because of these phenomena the maximum separating capacity of the known separator is reached already at low velocities of flow from the initial direction.

It is the object of the instant invention to design a liquid separator of the above-specified kind in such a way that the separating capacity is increased even at high velocities of flow while at the same time pressure losses are reduced.

The specified object is solved by the liquid separator of the invention being characterized in that the end of each guide plate is curved in the direction leading into the trap pocket in such a way that the tangent t to the separating edge of the guide plate extends into the trap pocket, that the velocity is substantially constant at least in the vicinity of the opening between guide plate and trap pocket, and that the end of the guide plate which has the separating edge is provided with a bent portion having a length l the maximum value of which is determined from the equation:

$$l_{max} = \dot{m} \cdot \frac{h}{\eta} \cdot \ln \frac{u(0)}{u(1)}$$

wherein $u(0)$ is the mean film velocity at the beginning of the bent portion, and $u(1)$ is the mean film velocity at the separating edge and $2.5 < u(0)/u(1) \leq 3.5$, $\dot{m}$ is the mass flow per unit of width, $h$ is the mean film thickness, and $\eta$ is the dynamic viscosity of the liquid, and wherein the practical length l of the bent portion is in the range of $0.2\, l_{max} < l \leq l_{max}$.

To the engineer in the field of fluid mechanics, "velocity" is a vectorial parameter. The fact that the gas velocity in the vicinity of the opening between guide plate and trap pocket is to be kept substantially constant in accordance with the invention therefore means that the opening is provided in a channel section without any acceleration of flow (e.g. by centrifugal forces), i.e. it is not provided at a deflection but is provided in a straight section, so that the droplets will not be transported across the opening but will be moved into the same and thus into the trap pocket. An optimum configuration would be one in which the leading edge of the trap pocket is disposed in linear extension of the channel wall upstream of the beginning of the bend.

In the liquid separator according to the invention the first trap pocket narrows the channel cross-section. Primary separation is improved thereby due to the fact that the gas and therefore also the droplet velocity is increased, whereby the centrifugal force acting on the droplets in the deflection is increased, and also due to the fact that because of the reduced channel width the droplets reach the separating wall more rapidly so that also smaller droplets are separated.

For optimum operation, the design of radius, length and mean angle of the inwardly bent portion of the guide plate as well as the channel width s are of importance. Criteria of design and limits pertaining to these dimensions are specified in the subclaims 2 to 5.

It is preferred to use a liquid separator in which the channel between adjacent parallel, vertically disposed structural members is configured with a plurality of successive deflections and trap pockets. In this case it would be advantageous that the first trap pocket as viewed in flow direction has no guide plate. Furthermore it would be advantageous for each structural member to have an enlargement on the outlet edge so as to prevent flow separation of the gaseous phase in the outlet region.

Typically, therefore, a liquid separator designed in accordance with the invention is not designed to be "symmetrical" relative to a centre plane. Rather, the liquid separator according to the invention comprises a plurality of stages of different design which are optimally adapted to the liquid available in the respective stages. It is therefore especially advantageous that the inlet stage as claimed in claim 7 and the outlet stage as claimed in claim 8 are configured so as to differ from the intermediate stage(s) which mainly serve(s) to introduce the wall film into the trap pockets. In a liquid separator according to the invention a major portion of the liquid contained in the gas stream is already separated by centrifugal action in the first stage in which large drops and strands are directly passed into the interior of the first baffle-free trap pocket. Upon entry of the second stage a major portion of the remaining water will be in the form of a film on the inner channel wall. The film is guided into a trap pocket where it is removed from contact with the gas stream. Moreover, any droplets still present in the gas stream are further separated by centrifugal action in the second stage.

The outlet stage is then intended to prevent flow separation phenomena by which pressure losses would be increased. This is achieved by configuring the outlet stage with an enlargement. This arrangement may be provided as a trap pocket and/or capillary drainage so as to drain off any additionally present residual liquid.

Mainly for reasons of manufacture but also for further improving the separation of water, a corrugation is provided downstream of each trap pocket, as is known per se, the bottom of said corrugation permitting a connection with a part of the structural member adjoining in the direction of flow. Due to the dead-water eddy induced in said corrugation, the flow is not affected by the corrugation so that practically no widening of the channel is caused thereby. The corrugation can be designed by an inclined entrance wall and the provision of inserts or the like to cause capillary drainage.

In the liquid separator according to the invention the stagnation effect of the trap pocket on the gas flow is minimum because the trap pocket does not project into the gas flow. The gas velocity over the trap pocket remains substantially constant, and the shearing strain of the gaseous phase which drives the film is effective approximately right to the droplet separating edge, all the more as the transition between guide plate and inwardly bent portion is progressive with a radius which preferably is in accordance with the equation of claim 3, i.e. without a sharp bend where the flow might undesirably break away before reaching the separating edge.

Embodiments of the invention will be described in detail below with reference to the schematic drawing, in which FIG. 1 is a horizontal sectional view of two adjacent structural members of a liquid separator designed in accordance with the invention;

Figure 1:
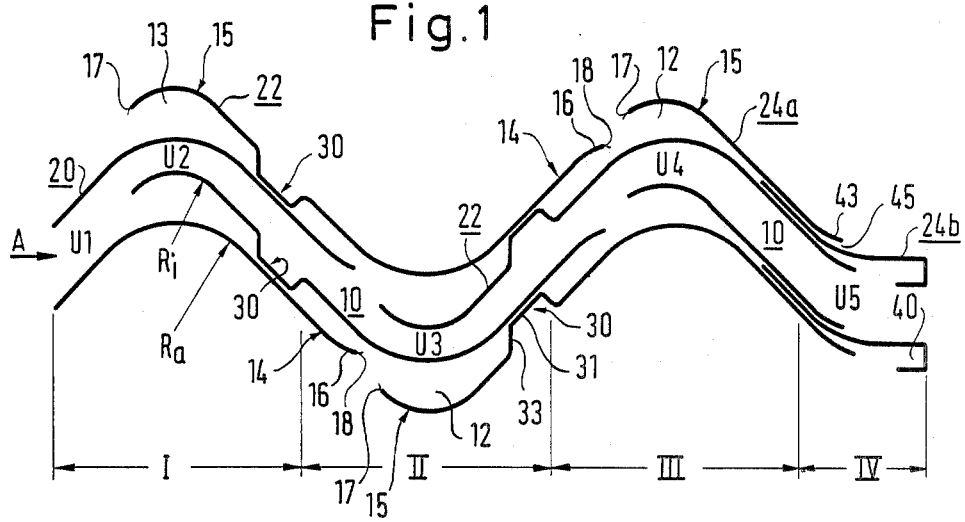

FIG. 1 is a horizontal sectional view of two parallel adjacent structural members of a liquid separator for separating in a wet-type cooling tower the droplets entrained in the two-phase flow of air and water. The two-phase flow is blown against the vertically disposed structural members from the left in the direction of the arrow as viewed in FIG. 1. Due to gravity, the separated water is drained normal to the drawing plane.

Each structural member is composed of a total of five sheet-metal parts which are spot-welded in accordance with their shape, viz. an inlet part 20, two intermediate parts 22 and an outlet part comprising two elements 24a, 24b.

A channel 10 is defined between two structural members, the cross-section of said channel being constant substantially along the entire length thereof and the gas being blown therethrough. The channel defines a total of five deflections U1 to U5. The first and the last deflection U1 and U5 are approx. 45°-deflections, while the deflections U2, U3 and U4 are 90°-deflections. The illustrated liquid separator therefore comprises four stages I to IV as shown in the drawing. Of course, the number of stages may be varied by adding further intermediate parts 22 if necessary.

Each structural member includes trap pockets 12, 13 and corrugations 30 downstream thereof. Except for a first trap pocket 13, a guide plate 14 is disposed upstream of the leading edge 17 of each trap pocket 12, the end of said guide plate having an inwardly bent portion 16 terminating in a separating edge 18. The tangent t to the inwardly bent portion in the vicinity of the separating edge 18 is directed into the trap pocket 12. The inwardly bent portion 16 is not bent sharply away from the guide plate 14 but is bent through a radius R, wherein the mean angle $\beta$ of the inwardly bent portion is smaller than, or at most equal to, the angle $\gamma$ of the tangent t and ranges from 7° to 13° and preferably is 10°. The length of the inwardly bent portion is referenced l. The design in the vicinity of the trap pocket is especially clear from FIG. 2. The dimensions s for the channel width and a for the depth of the trap pockets, which should not be less than 4 mm, are also indicated therein. It will be evident from FIG. 2 that the tangent t should fall within the depth a of the trap pocket 12 in the cross-sectional plane of the channel 10 which contains the leading edge 17.

The inwardly bent portion 16 of the guide plate 14 has the function of conducting as completely as possible the liquid deposited on the channel wall in the form of a liquid film into the pocket 12. The inventors have found that to this end a sufficient distance b upstream of the leading edge 17 must be observed, and it is absolutely necessary that the tangent t to the separating edge 18 of the guide plate 14 should be directed into the pocket 12. The following details should be observed. The maximum length $l_{max}$ is determined by the following equation:

$$l_{max} = \dot{m} \cdot \frac{h}{\eta} \cdot \ln \frac{u(0)}{u(1)}$$

wherein u(0) is the mean film velocity at the beginning of the inwardly bent portion and u(1) is the mean film velocity at the separating edge and $2.5 < u(0)/u(1) \leq 3.5$, $\dot{m}$ is the mass flow per unit of width, h is the mean film thickness, and $\eta$ is the dynamic viscosity of the liquid.

In this connection, l should be in the range of 0.2 $l_{max} < l \leq l_{max}$, preferably in the range of 0.7 $l_{max} < l \leq l_{max}$.

The mean angle $\beta$ of the inwardly bent portion should be in the range of 7° and 13° and preferably is about 10°.

The radius of curvature R of the inwardly bent portion is then calculated as $$R = \frac{l}{2\sin\beta}.$$

The distance between the separating edge 18 and the leading edge 17 of the trap pocket 12 results from the relationship $$b = K^2 \sin\beta \sqrt{l}$$

wherein K is a constant ranging from 4 to 6 and preferably being 5.

The channel width can be calculated from the equation $$s = \sqrt{\frac{\rho \cdot v \cdot T \cdot \alpha}{18 \cdot \eta_G}} \cdot d_{grenz}$$

wherein
v—velocity of flow from initial direction,
α—angle of deflection,
T—pitch of the structural members,
φ—density of the liquid,
ηG—dynamic viscosity of the gas,
$d_{grenz}$—desired limit drop size.

Figure 3:
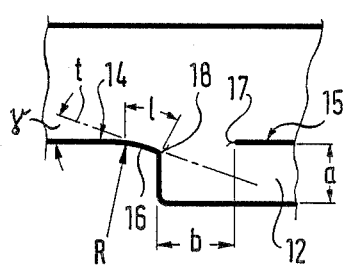
FIGS. 3 and 4 are two modifications of the design in the vicinity of the trap pockets which also are part of the invention.

FIG. 3 illustrates a modification in which the above-specified dimensioning rules apply analogously. The difference merely resides in that the separating edge is not formed at a free lip of the inwardly bent portion but is formed by a sharp bend in a continuous sheet-metal part.

Figure 2:
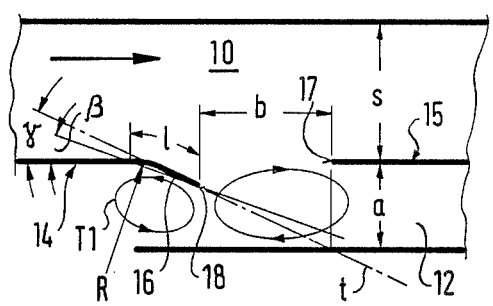
FIG. 2 illustrates in principle the design of the liquid separator of FIG. 1 in the vicinity of the trap pockets, in which the significant dimensions have been plotted.
Figure 4:
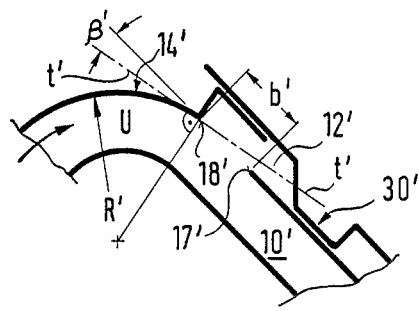

In FIG. 4, which also uses the same reference characters as FIGS. 1 to 3, the trap pocket differs from the aforedescribed embodiments in that it is disposed on the concave channel surface 14′ downstream of a deflection U. Basically, the dimensioning rules are the same as those explained above except for the dimensioning rule pertaining to the length l, which does not exist in this example. But in this embodiment, too, the inwardly bent portion formed in this case by the concavely bent channel wall adjacent the deflection U has a tangent t′ to the separating edge 18′ which is obliquely directed at an angle β′ into the succeeding trap pocket 12′ disposed at a distance b′. In this case the distance b′ is calculated from the equation $$b' = R' \cdot \sin \beta'(1 \div 1/K')$$

wherein K′=2 to 4, preferably 3, β′ is between 10° and 20°, preferably about 15°, and R′ is the radius of curvature of the outer deflection.

Figure 5:
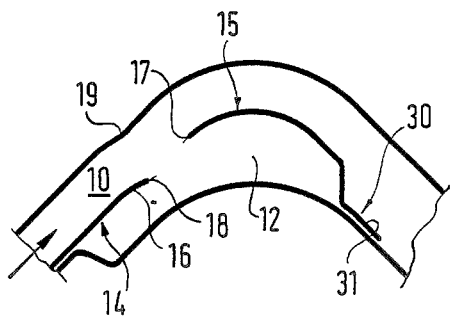
FIG. 5 shows a modified channel design in the vicinity of the trap pockets.
Figure 6:
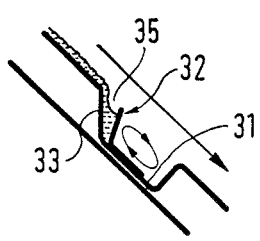
FIGS. 6 to 9 illustrate different embodiments of a corrugation which is downstream of the trap pocket as viewed in the direction of flow.

The embodiment illustrated in FIG. 5 is similar to the one shown in FIG. 1, the difference being that the channel wall which is opposed to the guide plate 14 with the inwardly bent portion 16 includes a depression 19 into the channel 10, said depression being dimensioned so that the gas flow will not be separated at the separating edge. Thereby the film is not subjected to any deceleration at the depression. In this embodiment, the design engineer is free to choose the length l of the depression, i.e. he is not strictly bound to the equation for $l_{max}$:

$$l_{max} = \dot{m} \cdot \frac{h}{\eta} \cdot 1 N \frac{u(o)}{u(1)}.$$

In all of the embodiments described, the liquid film deposited on the guide plate 14 is optimally transported into the trap pocket 12 where it is removed from contact with the gas stream. This can be explained as follows:

The resistance force caused by the trap pocket 12 on the gas flow is minimum, because the pocket does not project into the gas flow. The gas velocity over the opening to the pocket inlet, the "film trap" as it is called, remains substantially constant, and the shearing strain of the gaseous phase which drives the film is effective nearly to the separating edge 18, this being promoted also by the progressive bend-free transition of the guide plate 14 to the inwardly bent portion 16 and by the small mean angle of the inwardly bent portion which is between 7° and 13°.

There are two possibilities for the film running to the separating edge 18 to reach the interior of the trap pocket 12, these possibilities depending on the thickness h or the momentum of the film:

(a) With increasing film thickness h the momentum of the film will increase in consequence of a decreasing wall retaining effect at the separating edge 18. Starting from a certain film thickness h, the momentum will be sufficient to overcome the retaining forces. The then forming droplets are free from the frictional force of the wall and due to their still rather high kinetic energy will fly deep into the interior of the trap pocket 12. This process is promoted by the inwardly bent portion and also by the fact that the momentum of the film relative to the point of action of the retaining forces applies a moment which guides the film or the separated droplets into the trap pocket. The formation of a dead-water eddy in the trap pocket 12 is largely suppressed by the entering liquid.

(b) When the gas flow applies only a low shearing strain on the film, or when the film mass flow is very small, the momentum will be insufficient to overcome the retaining forces. In that case the film runs around the separating edge 18 where it is intercepted by the dead-water eddy T1 induced in the trap pocket (see FIG. 2) and is driven back still further. Due to the channel cross-section being kept approximately constant, the mean gas velocity retains its high value (about 2.5-times the flow velocity v in the inlet portion), so that a major portion of the droplets still contained in the gas flow is removed by centrifugal action.

The corrugation 30, which is respectively provided downstream of the first trap pocket 13 and the second trap pocket 12 (stage II), practically does not affect the gas flow. At the corrugation 30, the parts 20, 22 and 22, 22, respectively, are spot-welded to the bottom 31 of the corrugation 30. Furthermore, the corrugation is intended to receive and discharge the small quantity of water accumulating thereat. To this end the corrugation is provided with an entry wall 33 which is inclined at an angle of 45°. This inclined entry wall promotes entry of the film into the corrugation 30. The dead-water eddy induced in the corrugation prevents the film from penetrating to the bottom 31 of the corrugation. Rather, the film is dammed up before reaching the bottom and thence drains off downwardly in the form of liquid strands.

In stage IV there is also formed a trap pocket for the residual liquid in the form of an enlargement 40 which is hollow towards the direction of flow. This enlargement 40 is disposed in the outlet portion 24b. In addition to discharging the small residual liquid quantities which in part were separated by centrifugal force in the preceding deflection and in part were entrained in the gas flow from the preceding wall sections and in part reached the rear wall sections due to turbulent transport, the enlargement 40 also contributes to reducing pressure losses.

The outer channel wall of stage IV is provided with a capillary drainage 42 in the form of a slight bend of the single element 24a. Due to their kinetic energy and adhesion the liquid strands arriving thereat run around the outlet edge of the bend and are then drawn by the capillary forces into the interior of a narrowing gap 45 between the capillary drainage 42 and the outlet part 24b. The induced dead-water eddy promotes this process. It even drives droplets which are separated from the outlet edge of the bend into the same.

The low pressure losses of the described liquid separator are due, in addition to the enlargment at the outlet, to the optimum way in which the flow is guided in a flow channel which has substantially constant cross-section—apart from the inlet and the outlet thereof—and which has no trap pockets projecting into the flow. In an actually measured embodiment, the coefficient of pressure loss is between 4 and 5 and is therefore considerably less than in known liquid separators exhibiting a comparable degree of separation.

FIGS. 6 to 9 illustrate various embodiments of the corrugation 30 each having a capillary drainage 32. In the embodiment shown in FIG. 6, said capillary drainage with a progressively narrowing gap 35 is formed between the parts 32 and 33.

Figure 7:
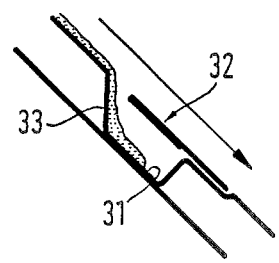

In the embodiment shown in FIG. 7, a capillary drainage 32 is caused by a sheet metal which extends almost to the beginning of the corrugation. The thus formed narrow inlet opening for the liquid film permits only a very weak dead-water eddy whereby the drainage capacity is improved.

Figure 8:
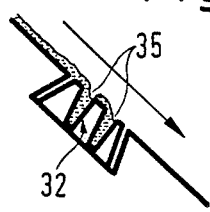

In the embodiment shown in FIG. 8, a capillary drainage 32 is formed in the corrugation by means of a serrated insert which provides a plurality of narrowing gaps 35.

Figure 9:
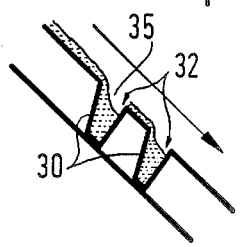

In the embodiment of FIG. 9, the corrugation 30 is replaced by two narrow corrugations 32 which form the narrowing capillary gaps 35.

FIGS. 10 to 14 illustrate configurations of the outlet end with the enlargement 40.

Figure 10:
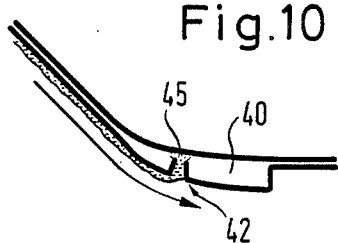
FIGS. 10 to 14 illustrate different embodiments of the last stage of the liquid separator of the invention, FIG. 14 being a sectional view along the arrows A-B of FIG. 13.

In the embodiment of FIG. 10, the capillary drainage 42 is formed by a gap 45 opening to the interior of the enlargement 40.

Figure 11:
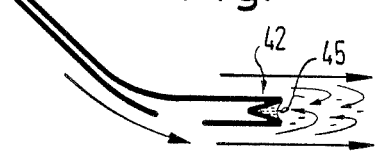

In the embodiment of FIG. 11, the capillary drainage 42 includes a gap 45 which narrows from the rear into the enlargement.

Figure 12:
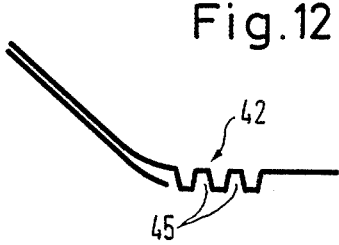

In the embodiment of FIG. 12, the capillary drainage 42 comprises a number of corrugations 45 arranged in series.

Figure 13:
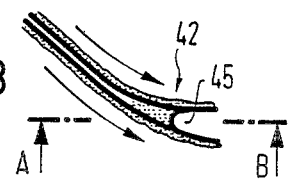
Figure 14:
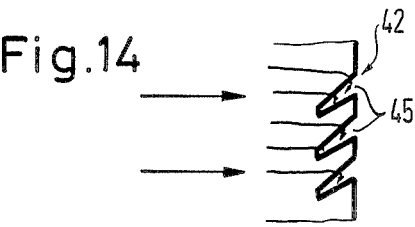

In the embodiment of FIGS. 13 and 14, the capillary drainage 42 comprises a number of capillary gaps 45 disposed transversely to the rear edge.

Typically, liquid separators of the kind described are used for drying steam in power plants. Due to the reduced pressure losses, however, use in wet-type cooling towers is now also conceivable.

We claim:

1. A liquid separator for separating liquid components entrained in a two-phase flow (gas/liquid), in which the flow is passed through a channel provided with one or more trap pockets for the liquid components, said pockets each having a leading edge associated therewith and an associated guide plate upstream thereof which at its end has separating edges for the liquid, in which the separating edge (18) of each guide plate (14) is disposed at a distance (b) upstream of the leading edge (17) of the associated trap pocket (12), characterized in that the end of each guide plate (14) is curved in the direction leading into the trap pocket (12) in such a way that the tangent (t) to the separating edge (18) of the guide plate (14) extends into the trap pocket (12), that the velocity is substantially constant at least in the vicinity of the opening between guide plate and trap pocket, and that the end of the guide plate (14) which has the separating edge (18) is provided with a bent portion (16) having a length (l) the maximum value of which is determined from the equation $$l_{max} = \dot{m} \cdot \frac{h}{\eta} \cdot \ln \frac{u(0)}{u(1)}$$

wherein u(0) is the mean film velocity at the beginning of the bent portion, and u(1) is the mean film velocity at the separating edge and $2.5 < u(0)/u(1) \leq 3.5$, $\dot{m}$ is the same mass flow per unit of width, h is the mean film thickness, and $\eta$ is the dynamic viscosity of the liquid, and wherein the practical length (l) of the bent portion (16) is in the range of $0.2 l_{max} < 1 \leq l_{max}$.

2. The liquid separator as claimed in claim 1, characterized in that the bent portion (16) is bent out of the direction of flow by a mean angle ($\beta$) which ranges from 7° and 13°.

3. The liquid separator as claimed in claim 2, characterized in that the bent portion (16) is bent away from the wall at a radius of curvature R where $$R = \frac{1}{2\sin\beta}.$$

4. The liquid separator as claimed in claim 2, characterized in that the distance (b) between the separating edge (18) and the edge (17) of the inlet opening of the trap pocket (12) is determined by the relationship $$b = K^2 \sin\beta \sqrt{1}$$

in which K is a constant ranging from 4 to 6 and is preferably 5.

5. The liquid separator as claimed in claim 2, characterized in that the bent portion (16) is bent out of the direction of flow by a mean angle ($\beta$) which is preferably 10°.

6. The liquid separator as claimed in claim 1, characterized in that the channel width (s) is determined by the relationship $$s = \sqrt{\frac{\rho \cdot v \cdot T \cdot \alpha}{18 \cdot \eta_G}} \cdot d_{grenz}$$

wherein
v—velocity of flow from initial direction,
α—angle of deflection
T—pitch of the structural members,
φ—density of the liquid,
ηG—dynamic viscosity of the gas,
$d_{grenz}$—desired limit drope size.

7. The liquid separator as claimed in claim 1, characterized in that between adjacent parallel, vertically disposed structural members the channel is configured with a plurality of successive deflections (15) and trap pockets (12), and that the first trap pocket (13) as viewed in the direction of flow has no guide plate.

8. The liquid separator as claimed in claim 7, characterized in that every structural member includes an enlargement (40) at the outlet edge so as to prevent flow separation of the gaseous phase in the outlet region.

9. The liquid separator as claimed in claim 8, characterized in that the enlargement (40) includes at least one capillary drainage (42).

10. The liquid separator as claimed in claim 9 characterized in that the capillary drainage (32, 42) includes an inwardly narrowing gap (35, 45).

11. The liquid separator as claimed in claim 7, characterized in that downstream of each trap pocket (12) a corrugation (30) is provided for joining serially arranged structural parts (20, 22, 24a, 24b) of a channel wall and for additionally discharging separated liquid.

12. The liquid separator as claimed in claim 11, characterized in that a capillary drainage (32) for improving liquid discharge is provided in the corrugation (30).

13. The liquid separator as claimed in claim 7, characterized in that said separator is a modular system comprising a total of three different sheet-metal members (20, 22, 24a, 24b), viz. an inlet member (20), an outlet member (24a, 24b) and an intermediate member of which a plurality is used for a multi-stage design.

14. The liquid separator as claimed in claim 13, characterized in that the said separator is a modular system comprising a total of three different plastic structural members (20, 22, 24a, 24b), viz. an inlet member (20), an outlet member (24a, 24b) and an intermediate member of which a plurality is used for a multi-stage design.

15. The liquid separator as claimed in claim 1, characterized in that the channel wall opposite the bent portion (16) is formed with a depression directed into the channel (at 19) so as to prevent flow separation of the gaseous phase up to the separating edge 18.

16. The liquid separator as claimed in claim 1, characterized in that, when the trap pocket (12') is provided on a concave channel side (14'), the distance (b') between the separating edge (18') and the edge (17') is determined by the equation $$b' = R' \cdot \sin \beta'(1 + 1/K')$$

wherein
 $R'$—is the radius of curvature of the outer deflection,
 $\beta'$—is the angle included by the tangent (t') to the separating edge and the direction of flow downstream of the deflection, ranging from 10° to 20° and preferably being 15°,
 $K'$—is a constant ranging from 2 to 4 and preferably being 3.

* * * * *